(12) United States Patent
Hibino

(10) Patent No.: US 7,899,439 B2
(45) Date of Patent: Mar. 1, 2011

(54) WIRELESS COMMUNICATION MANAGEMENT SYSTEM WHICH PREVENTS COMMUNICATION WHEN SECURITY FUNCTION IS NON-OPERATIVE

(75) Inventor: Masaaki Hibino, Yokkaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 346 days.

(21) Appl. No.: 11/297,371

(22) Filed: Dec. 9, 2005

(65) Prior Publication Data

US 2006/0128360 A1    Jun. 15, 2006

(30) Foreign Application Priority Data

Dec. 9, 2004    (JP) ................... 2004-357074

(51) Int. Cl.
*H04M 1/66* (2006.01)
(52) U.S. Cl. ........... 455/410; 455/456.4; 455/550.1; 455/418; 455/404.2; 370/328
(58) Field of Classification Search .......... 455/410, 455/411, 415, 456.1–6, 550.1, 418, 404.2; 370/328
See application file for complete search history.

(56) References Cited

U.S. PATENT DOCUMENTS

| 6,411,807 | B1 * | 6/2002 | Amin et al. ............... 455/432.3 |
| 6,556,819 | B2 * | 4/2003 | Irvin ....................... 455/410 |
| 6,856,695 | B1 * | 2/2005 | Nakamura et al. ......... 382/124 |
| 2003/0091015 | A1 | 5/2003 | Gassho et al. |
| 2007/0143824 | A1 * | 6/2007 | Shahbazi ................... 726/1 |

FOREIGN PATENT DOCUMENTS

| JP | 2004-304315 A | 10/2004 |
| WO | WO 01-74011 | 10/2001 |
| WO | WO 2004-057834 | 7/2004 |
| WO | WO 2004057834 A2 * | 7/2004 |

OTHER PUBLICATIONS

Search Report & Search Opinion to European patent application No. 05257580.0 dated Mar. 16, 2006 (8 pages).
Notification of Reasons of Rejection dispatched Jan. 8, 2008 in Japanese Application No. 2004-357074 and English translation thereof.

* cited by examiner

*Primary Examiner* — Kamran Afshar
*Assistant Examiner* — Vladimir Magloire
(74) *Attorney, Agent, or Firm* — Banner & Witcoff, Ltd.

(57) ABSTRACT

A wireless communication management system for managing a wireless communication device implemented with a security function may be provided with a security judging unit configured to judge whether a predetermined condition regarding security is satisfied, and a communication restriction unit that restricts the wireless communication with the external device if the security judging unit judges that the predetermined condition is not satisfied.

24 Claims, 10 Drawing Sheets

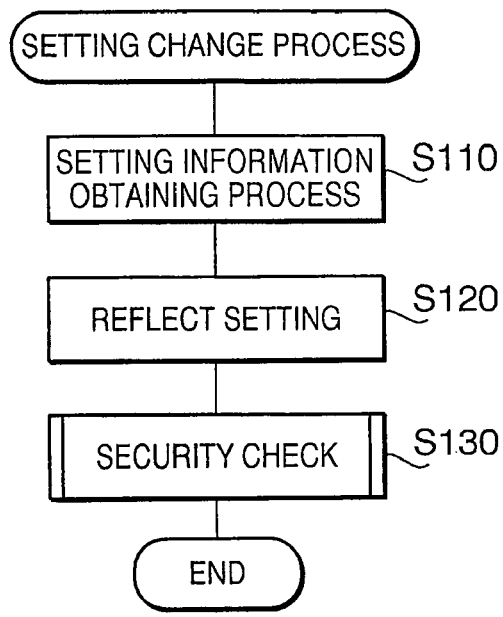
FIG. 3
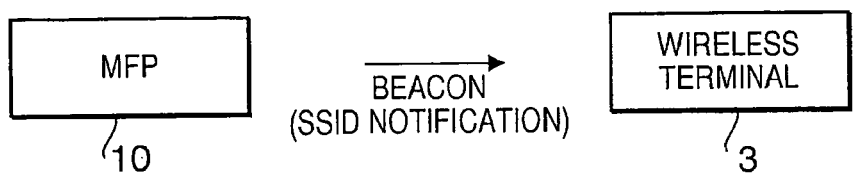
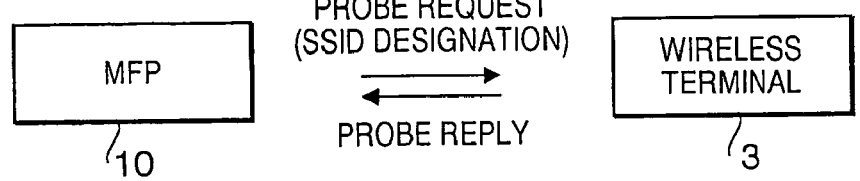
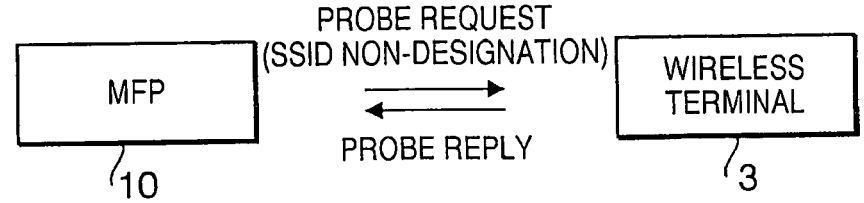

| | AUTHENTICATION | ENCRYPTION |
|---|---|---|
| 1 | Opensystem | None |
| 2 | Opensystem | WEP |
| 3 | Sharedkey | WEP |
| 4 | WPA-PSK | TKIP |
| 5 | WPA-PSK | AES |

WIRELESS COMMUNICATION MANAGEMENT SYSTEM WHICH PREVENTS COMMUNICATION WHEN SECURITY FUNCTION IS NON-OPERATIVE

INCORPORATED BY REFERENCE

This application claims priority from Japanese patent application No. 2004-357074, filed on Dec. 9, 2004, the entire subject matter of which is incorporated herein by reference.

BACKGROUND

1. Technical Field

Aspects of the present invention relate to a wireless communication management system that manages a wireless communication device having a security function. Aspects of the invention also relate to the wireless communication device for such a management system, a program for realizing such a system, and a method of managing the wireless communication device.

2. Related Art

Conventionally, wireless communication devices capable of communication with devices on a wireless LAN (local network device) have been known. As a wireless LAN, ad-hoc network and infrastructure type network system are typically known. In the ad-hoc network, a network is configured such that each wireless communication device functions as a station. On the other hand, in the infrastructure type network device, a network is configured such that the wireless communication among the wireless communication devices is executed using a particular wireless communication device that functions as an access point.

The wireless LAN is advantageous in that, in comparison with a wired LAN, no wiring is necessary. However, since the communication is performed wirelessly, an unauthorized access to the network, leakage of information by interception of communication and the like may occur.

Therefore, in general, a wireless communication device is implemented with an authentication function and/or encrypting function. The authentication function is a function requiring authentication when a communication is established with an external device. The encrypting function is a function to encrypt a transmission signal to be transmitted to an external device. An example of such a device is disclosed in a Japanese Patent Provisional Publication P2004-289723A. This type of wireless communication devices is configured to store authentication key and/or encryption key as parameters that characterize the authentication and/or encryption functions. Using such parameters, the wireless communication device authenticates another wireless communication device on the wireless LAN, encrypts a transmitting signal and decrypts a received signal.

The authentication key and encryption key that characterize the authentication and encryption functions should be determined as unique keys. Therefore, it is typical that security functions such as the authentication function, encryption function and the like is disabled when the device is shipped from the factory (i.e., at a default state). Alternatively, although the security functions are enabled, relatively simple default keys are generally set, and in the initial state, sufficient security function cannot be expected, which has been considered to be problematic.

That is, if a user of such a wireless communication device is unstudied in the security function, he/she may consider that the device is adequately protected as it functions in the default state (i.e., with the security settings disabled). In such a case, the user may keep using the wireless communication device without actuating the security settings.

When the wireless communication device operates with the default security keys, which may easily be known by a person having nefarious intent, the security function of the wireless communication device does not fully function. However, the unstudied user may think the security function is fully activated, and keep using the device without modifying the default settings of the authentication and/or encryption settings.

Further, even if the user pays attention to the security function, generally used wireless communication devices are not implemented with a function of continuously notifying the user whether the security function thereof is activated throughout the communicating operation. Therefore, the user may misunderstand the security status of the communication device.

SUMMARY

According to aspects of the invention, an improved wireless communication management system is provided, which is configured such that a wireless communication with an external device with insufficient or disabled security settings may be prevented as the user forgets to activate the security function or is not aware of necessity of resetting the security settings.

DESCRIPTION OF THE ACCOMPANYING DRAWINGS

FIG. 3 shows a flowchart illustrating a setting modifying process according to aspects of the invention.

FIG. 4A illustrates an operation of a beacon transmitting function unit and FIGS. 4B and 4C illustrate operations of a probe responding function unit, respectively, according to aspects of the invention.

DETAILED DESCRIPTION

General Overview

Figure 1:
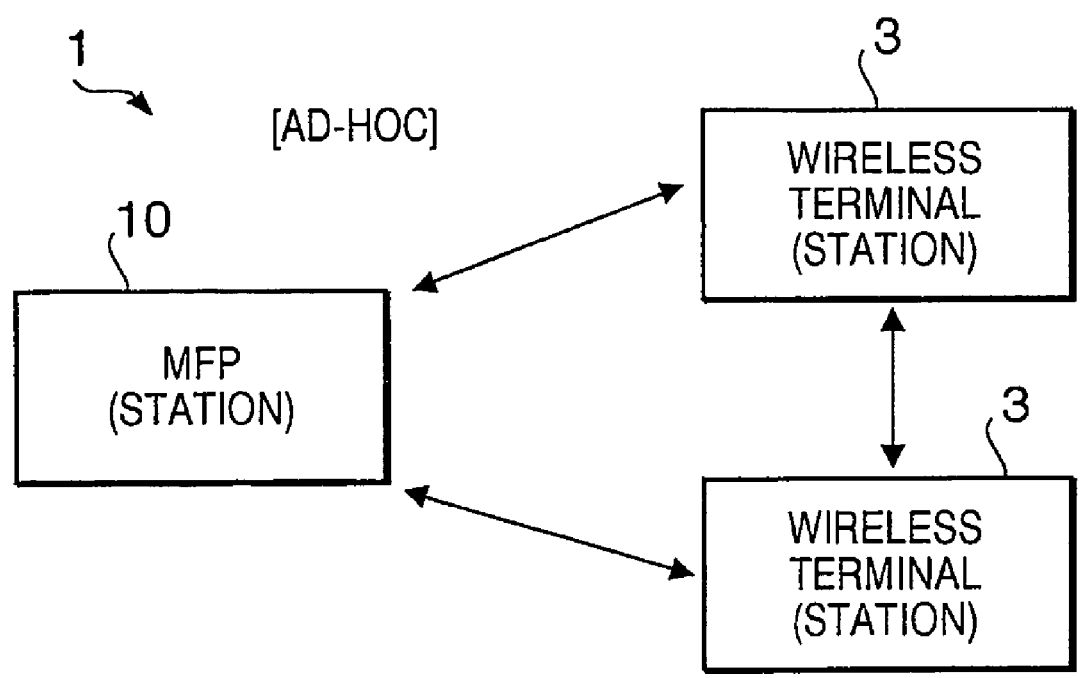
FIG. 1 is a block diagram showing a configuration of a network including a digital MFP (Multi Function Peripheral) according to aspects of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to aspects as described herein, there is provided wireless communication management system for managing a wireless communication device having a security function. The wireless communication management system includes a security judging unit configured to judge whether a predetermined condition regarding security is satisfied, and a communication restriction unit that restricts the wireless communication with the external device if the security judging unit judges that the predetermined condition is not satisfied.

According to aspects as described herein, there is provided a wireless communication management system for managing a wireless communication device implemented with a security function. The communication system may be provided with a security judging unit configured to judge whether the security function of the communication device is operating when the wireless communication device is capable of performing a wireless communication with an external device, and a communication restriction unit that restricts the wireless communication with the external device if the security judging unit judges that the security function of the communication device is not operating.

According to the wireless communication management system above, when the security function does not operate, the communication restriction unit restricts the communication between the wireless communication device and the external device. Therefore, it is possible to prevent a situation where the wireless communication device keeps operating in a state that the external device can communicate with the wireless communication device with the security function of the wireless communication device being inoperative. Accordingly, with this configuration, even if a user fails to set the security function of the wireless communication device, the network security will not be deteriorated.

In the above configuration, it may be possible that the restriction of the communication is maintained until the wireless communication device is reset. However, if the restricted status is kept after the user has noticed the situation and the security function is started to operate, it may be inconvenient for the user.

According to further aspects, the wireless communication management system may further be provided with a restriction releasing unit that releases the restriction effected by the communication restriction unit if the security function of the wireless communication function starts to operate after the wireless communication between the wireless communication device and the external device was restricted.

With the above configuration, if, for example, the user simply switches a state of the security function from OFF to ON, the restriction is released. Therefore, the user need not restart the wireless communication device. In some cases, such a configuration may be convenient for the user.

Incidentally, some wireless communication devices may be configured such that, although the security function is in an ON state, parameters characterizing the security function (e.g., authentication code, encryption key, etc.) are set to relatively simple ones so that the user can start using the device with less troublesome setting operations.

In the above case, even if the security function is operating, the degree of the security may not be sufficient, and if remained as it is, the wireless communication device may be used inappropriately by a person of bad will or nefarious intent. Therefore, it may be appropriate to restrict the communication if such parameters are insecure.

In this regard, according to aspects, there is provided a wireless communication management system for managing a wireless communication device implemented with a security function, which is provided with a security judging unit configured to judge whether a value of a parameter that characterizes an operation of the security function of the communication device has a default value when the wireless communication device is capable of performing a wireless communication with an external device, and a communication restriction unit that restricts the wireless communication with the external device if the security judging unit judges that the value of the parameter is the default value.

In this configuration, it may be convenient if the restriction is released when the user has changed the parameter value.

In this respect, according to aspects, the wireless communication management system may further include a restriction releasing unit that releases the restriction effected by the communication restriction unit if the value of the parameter is changed to a value different from the default value after the wireless communication between the wireless communication device and the external device was restricted.

Some wireless communication devices may have a function of outputting a notification signal (e.g., so-called a beacon signal) toward other devices on the network to notify the other devices of the existence of the wireless communion device. Other wireless communication devices may be configured to receive an inquiry signal from the devices on the network first, and then outputs a notification signal to the device from which the inquiry signal was received (which is know as a probe response). For such device, by disabling the notification signal, the existence of the wireless communication device can be hidden from the other devices on the network.

That is, according to aspects, the wireless communication device may include a notification output unit that outputs a notification signal indicating that the wireless communication device exists to the external device. Further, the communication restriction unit may be configured to disable the notification output unit from outputting the notification signal so that the wireless communication device is hidden from the external device, thereby restricting the wireless communication between the wireless communication device and the external device.

According to the above configuration, simply by disabling the function of outputting the notification signal, the communication between the wireless communication device and the external device can be disabled.

The notification output unit may be configured to voluntarily output the notification signal to the external device if a predetermined condition is satisfied.

The notification signal may generally include information necessary to access the wireless communication device. Therefore, by disabling the output of such a signal, deterioration of the network security due to the user's failure of setting of the security function can be compensated for and the network security will not deteriorate.

If the wireless communication device receives at least one of an inquiry signal directed to the wireless communication device and an inquiry signal directed to unidentified devices, the notification output unit outputs the notification signal to the external device from which the wireless communication device has received the inquiry signal, and the communication restriction unit may be configured to disable the notification output unit from outputting the notification signal to the external device only when the wireless communication device has received the inquiry signal directed to unidentified devices.

When the external device transmits the inquiry signal to a specific wireless communication device, it is likely that the user of the external device has information regarding the destination wireless communication device. In such a case, it is likely that the user of the external device is an authorized user of the external device. On the other hand, if the external device transmits the inquiry to unidentified devices, without designating the destination, the external device may searches for existing wireless communication devices. To reply to such an inquiry may result in an inappropriate usage of the wireless communication device by a person of bad will.

Therefore, if the received inquiry signal is directed to the wireless communication device, the response thereto may not be inhibited. On the other hand, if the received inquiry signal is not directed to a specific device, it may be secure not to reply to the inquiry signal. With this configuration, the appropriate access by the authorized user can be normally processed, and inappropriate access from the external device to the wireless communication device can be effectively restricted. With this configuration, the deterioration of the network security can be prevented without causing inconvenience to the authorized users.

The above restriction may be implemented immediately when the security function is determined to be inoperative, or immediately when the parameter value is the same as the default value. However, when the user uses the wireless communication device, if such a limitation is applied immediately, it may be difficult to set the security function using the external device, which is inconvenient to the user.

In this regard, the communication restriction unit may be configured to restrict the wireless communication with the external device a predetermined period after the security judging unit has judged that the security function of the communication device is not operating.

According to such a configuration, the user can set the security setting using the external device before the predetermined period expires, which is convenient.

In particular, in at least one aspect of the invention, if the wireless communication device is an access point, printer, digital MFP and the like, which may not have a user interface having a high operability, it is very convenient that the external device can be used for perform the security setting.

The communication restriction unit may include a data storage storing the predetermined period. With this configuration, the predetermined period need not be a fixed value, but can be changed by overwriting the stored value depending on, for example, usage environment of the wireless communication device. The data storage may be a non-volatile re-writable data storage.

The security judging unit judges whether the security function of the communication device is operating during the predetermined period, and the communication restriction unit may be configured not to restrict the communication between the wireless communication device and the external device if the security judging unit judges that the security function of the communication device is started to operate during the predetermined period.

The wireless communication system may further include a restriction notification unit that notifies of the restriction of the wireless communication between the wireless communication device and the external device when the communication restriction unit restricts the wireless communication between the wireless communication device and the external device.

With this configuration, the used can recognize a situation regarding the security setting, and can deal with the issue at an early stage.

Typically, the security function may include at least one of a function to executed an authentication procedure when the wireless communication device starts the wireless communication with the external device and a function of encrypting signal to be transmitted from the wireless communication device to the external device.

In order to perform the authentication procedure, it is necessary to set the authentication code. For encryption, it is necessary to set the encryption code. The wireless communication device utilizing such functions, the security functions may be turned OFF or only simple codes are set as the authentication and encryption codes at an initial stage. If the above described configuration is employed in such a device, the wireless communication device is prevented from being kept operating without insufficient security settings.

According aspects, there is provided a wireless communication device implemented with a wireless communication function to perform a wireless communication with an external device and a security function to secure a communication security, which is provided with a security judging unit configured to judge whether a predetermined condition regarding security is satisfied, and a communication restriction unit that restricts the wireless communication with the external device if the security judging unit judges that the predetermined condition is not satisfied.

According aspects, there is provided a wireless communication device implemented with a wireless communication function to perform a wireless communication with an external device and a security function to secure a communication security, which is provided with a security judging unit configured to judge whether the security function of the communication device is operating when the wireless communication device is capable of performing the wireless communication with the external device, and a communication restriction unit that restricts the wireless communication with the external device if the security judging unit judges that the security function of the communication device is not operating.

According to further aspects, there is provided a wireless communication device implemented with a wireless communication function to perform a wireless communication with an external device and a security function to secure a communication security, which is provided with a storage unit configured to store a parameter that characterizes an operation of the security function of the communication device, a security judging unit configured to judge whether a value of the parameter stored in the storage unit has a default value when the wireless communication device is capable of performing a wireless communication with an external device, and a communication restriction unit that restricts the wireless communication with the external device if the security judging unit judges that the value of the parameter is the default value.

According to aspects, there is provided a computer program including instructions to be executed by a computer, the computer operating to manage a wireless communication device implemented with a security function for securing a security of a communication, the instructions causing the computer to perform the steps of judging whether a predetermined condition regarding security is satisfied, and restricting the wireless communication with the external device if it is judged that the predetermined condition is not satisfied.

According to aspects, there is provided a computer program including instructions to be executed by a computer, the computer operating to manage a wireless communication device implemented with a security function for securing a security of a communication, the instructions causing the computer to perform the steps of judging whether the security function of the communication device is operating when the wireless communication device is capable of performing the wireless communication with the external device, and restricting the wireless communication with the external device if it is judged that the security function of the communication device is not operating.

According to further aspects, there is provided a computer program including instructions to be executed by a computer, the computer operating to manage a wireless communication device implemented with a security function for securing a security of a communication, the instructions causing the computer to perform the steps of judging whether a value of the parameter characterizing the security function of the wireless communication device has a default value when the wireless communication device is capable of performing a wireless communication with an external device, and restricting the wireless communication with the external device if the security judging unit judges that the value of the parameter is the default value.

According to yet other aspects, there is provided a method of managing a wireless communication device implemented with a security function for securing a security of a communication, the instructions causing the computer to perform the steps of judging whether the security function of the communication device is operating when the wireless communication device is capable of performing the wireless communication with the external device, and restricting the wireless communication with the external device if it is judged that the security function of the communication device is not operating.

According to other aspects, there is provided a method of managing a wireless communication device implemented with a security function for securing a security of a communication, the instructions causing the computer to perform the steps of judging whether a value of the parameter characterizing the security function of the wireless communication device has a default value when the wireless communication device is capable of performing a wireless communication with an external device, and restricting the wireless communication with the external device if the security judging unit judges that the value of the parameter is the default value.

EMBODIMENTS

Referring to the accompanying drawings, various wireless communication management systems according to embodiments and modifications of the present invention will be described in detail.

Figure 2A:
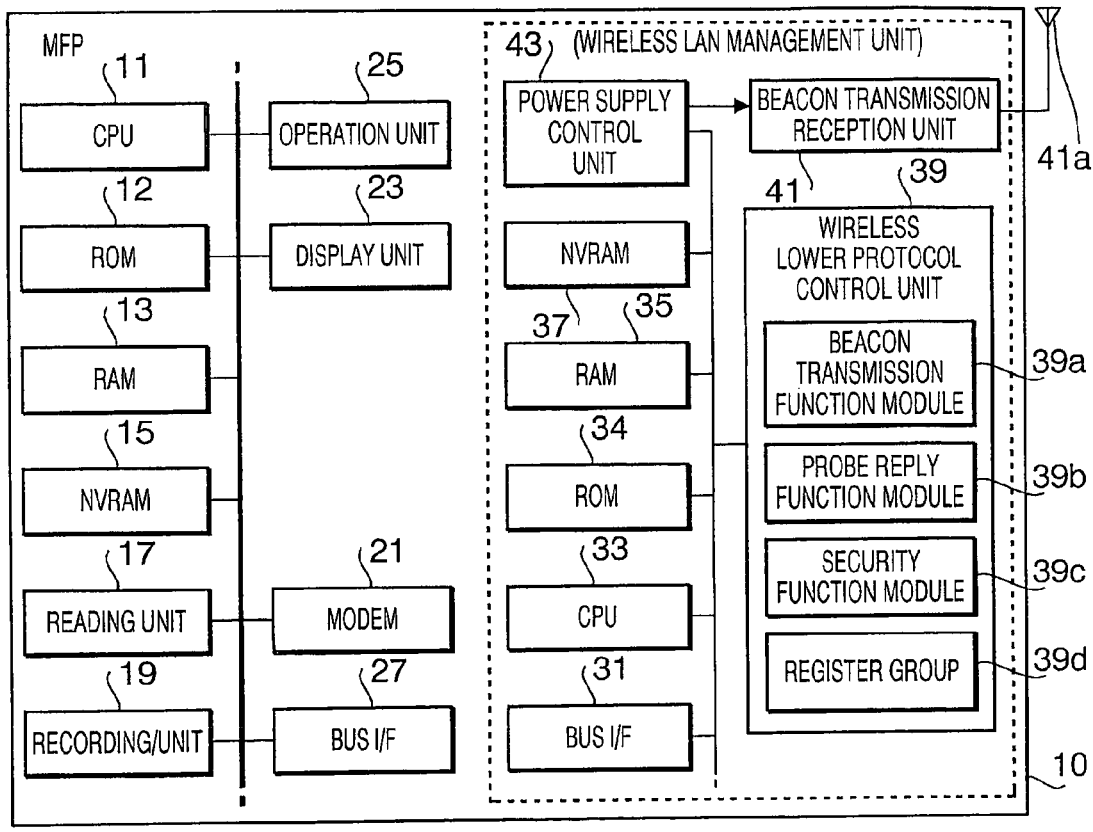
FIGS. 2A and 2B show block diagrams showing configurations of the MFP and a part of a wireless LAN control unit, respectively, according to aspects of the invention.
Figure 2B:
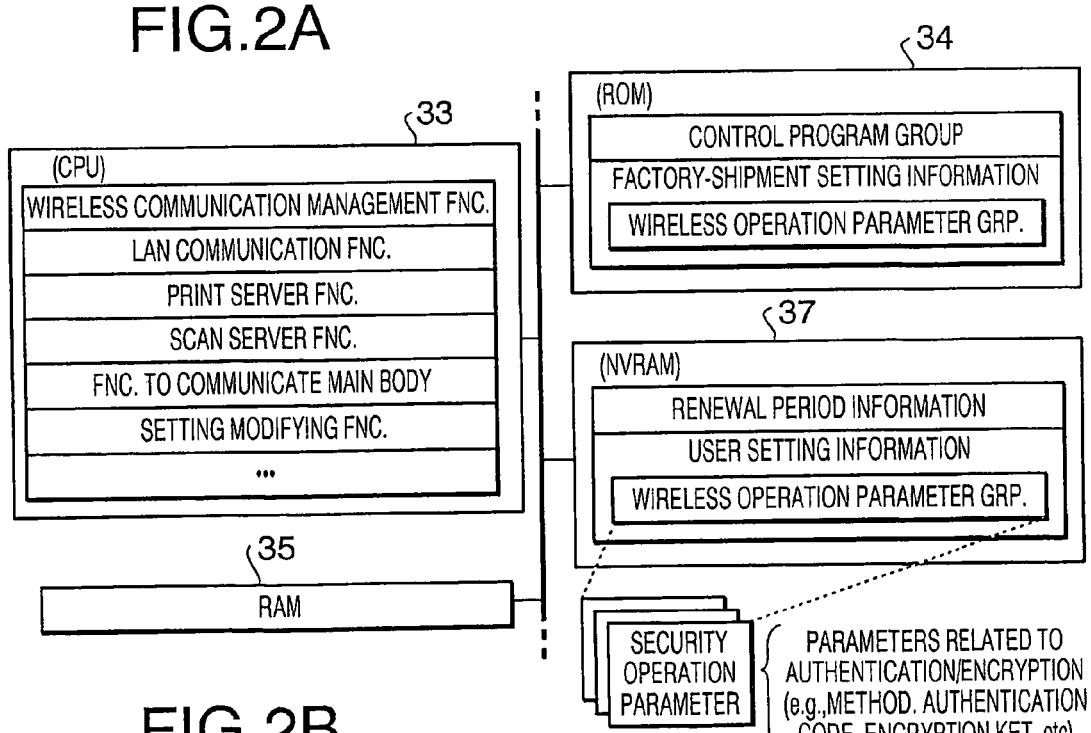

FIG. 1 schematically shows a configuration of a network 1 including a digital MFP (Multi Function Peripheral) 10 according to a first embodiment of the invention. FIG. 2A is a block diagram showing a configuration of the MFP 10. FIG. 2B is a block diagram showing part of the MFP 10: functions realized by a CPU 33 of a wireless LAN control unit 300, and data types stored in memories of the wireless LAN control unit 30.

The network 1 shown in FIG. 1 may be an ad-hoc wireless network. In this network 1, the MFP 10 functions as a station. According to the first embodiment, the MFP 10 has functions of a scanner, a printer, a copier and a facsimile device.

As shown in FIG. 2A, the MFP 10 is provided with a CPU (Central Processing Unit) 11 that executes various programs, a ROM (Read Only Memory) 12 that stores the programs to be executed by the CPU 11, a RAM (Random Access Memory) 13 which is uses as a working area when the CPU 11 executes the programs, an NVRAM (Non-Volatile RAM) 15 for storing setting information and the like, a reading unit 17 and a recording unit 19, a modem 21, a display unit 23, an operation unit 25, a bus interface (I/F) 27 and the wireless LAN control unit 30.

The wireless LAN control unit 30 includes a bus interface (I/F) 31 which is connected to the bus I/F 27 of the main body, the CPU 33, a ROM 34, a RAM 35, an NVRAM 37, a wireless lower protocol control unit 39, a wireless transmission/reception unit 41 and a power supplying unit 43.

The reading unit 17 reads an image formed (e.g., printed) on an original using an imaging elements such as a CCD (Charge Coupled Device) and generates an image data representing the read (scanned) image. The recording unit 19 forms (e.g., prints) image on a sheet type recording medium based on print data.

When the CPU 11 receives a print command from an external device (e.g., a terminal device 3), the CPU 11 controls the recording unit 19 in accordance with print data that has been input together with the print command to so that the recording unit 19 forms an image based on the print data on the sheet type recording medium (i.e., the printer function). When the CPU 11 receives a read command, the CPU 11 controls the reading unit 17 to read image on an original loaded onto the reading unit 17 and outputs image data representing the read image (i.e., the scanner function).

The modem 21 is connectable, for example, to a PSTN (Public Switched Telephone Network) and is used for exchanging facsimile data with an external facsimile device which is also connectable to the PSTN.

In addition to the above, the display 23 is provided with an LCD (Liquid Crystal Display), not shown, for displaying various pieces of information to the user. The operation unit is provided with multiple operable keys (not shown) for allowing the user to input information (e.g., operational commands, etc.), which is transmitted to the CPU 11.

The wireless LAN control unit 30 is detachably connected to the bus interface 27 and enables the wireless communication function when connected. In the ROM 34 provided to the wireless LAN control unit 30, various programs for realizing the communication function, and factory-shipping setting information including default values of the wireless communication operational parameters that characterize the wireless communication operation controlled by the wireless LAN control unit 30, are stored. In the NVRAM 37, a renewal period, which is read in a security checking process (FIG. 8; described later), is stored at the factory-shipment. Further, in the NVRAM 37, user setting information including each wireless operational parameters designated externally (by the user) in accordance with the setting modifying function of the CPU 33 is stored.

FIG. 3 shows a flowchart illustrating the setting modifying process executed by the CPU 33 of the wireless LAN control unit 30. The setting modifying function is realized as the CPU 33 executes the process shown in FIG. 3. When the CPU 33 receives the setting modification command from the CPU 11 or the wireless terminal 3 (see FIG. 1), the CPU 33 executes the setting modifying process. When this process starts, the CPU 33 obtains values of the wireless operation parameters of a target device from the CPU 11 through the bus interface 31 with use of the communication function with the main body.

It should be noted that the communication function with the main body can be realized by a task on the CPU 33 that communicates with the CPU 11 through the bus interface. It should be noted that, according to the illustrative embodiment described herein, if an instruction to display a setting window is input, by the operation of the user, through the operation unit 25, the CPU 11 displays the setting window for setting values of the wireless operation parameters, and obtains information the user input through the setting window with the operation unit 25, and outputs the wireless operation parameter values of the target device in accordance with the operation information.

When the wireless operation parameter values of the target device is obtained from the wireless terminal 3, the CPU 33 obtains the wireless operation parameter values of the target device via the wireless transmission/reception unit 41 and the wireless lower protocol control device 39 making use of the wireless communication control function and LAN communication function (S110). It should be noted that the wireless communication control function is realized by a task on the CPU 33 for controlling the wireless transmission/reception unit 41 that realizes the wireless communication and the wireless lower protocol control unit 39, and the LAN communication is realized by a task (i.e., a protocol stack) on the CPU 33 for realizing an IP (Internet Protocol) communication.

After S110, the CPU 33 edits the user setting information stored in the NVRAM 37 based on the information obtained in S110 to change the wireless operation parameter values contained in the user setting information, and the wireless communication operation of the wireless LAN control unit 30 (S120). Specifically, the CPU 33 changes the wireless operation parameter values set in the register of the wireless lower protocol control unit 39.

If the user setting information is not stored in the NVRAM 37, the CPU 33 retrieves the factory-shipment setting information from the ROM 34, and changes the wireless operation parameter values of the target device described in the factory-shipment setting information. Then, the changed information is stored in the NVRAM 37 as the user setting information, thereby the user setting information is generated.

Figure 8:
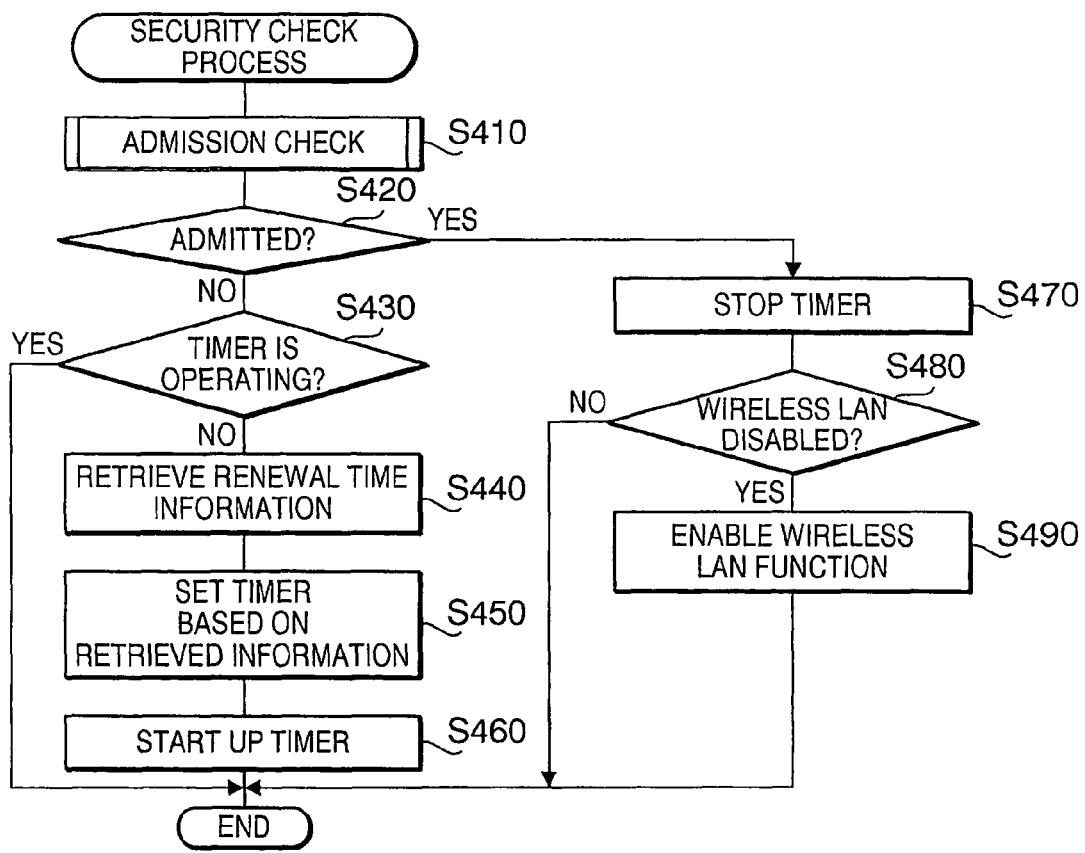
FIG. 8 shows a flowchart illustrating a security checking process executed by the CPU of the controlling unit of the MFP according to aspects of the invention.

After executing S120, the CPU 33 executes the security checking process shown in FIG. 8 (S130). The security checking process will be described in detail later. After execution of S130, the CPU 33 finished the setting changing process.

As described above, the CPU 33 includes the setting modifying function, wireless communication control function, LAN communication function, and a function of communicating with the main body. Further, the CPU 33 includes a print server function that enables a printer function implemented in the main body via an external wireless terminal 3 and a scan server function that provides the external wireless terminal 3 with the scanner function implemented with the main body.

Further, the wireless reception unit 41 is provided with a demodulating circuit that overlaps the transmission data on a radio (RF) signal generated by the wireless lower protocol control unit 39. Then the radio signal is output through the antenna 41a. Further, the radio signal is received through the antenna 41a, and digital data is extracted from the received radio signal.

When data to be transmitted, which is generated in the MFP 10, is input, the wireless lower protocol control unit 39 generates transmission data by adding header information and the like to the input data and transmits the transmission data to the wireless transmission/reception unit 41 (transmission process). Further, based on the reception data which is received through the wireless reception unit 41, the wireless lower protocol control unit 39 executes a predetermined reception process (if the received data is encrypted, decryption process is also performed). Then, if necessary, the thus processed reception data is transmitted to the CPU 33. It should be noted that the wireless lower protocol control unit 39 executes various processes for realizing the communication with the wireless terminal in accordance with a predetermined protocol.

Specifically, the wireless lower protocol control unit 39 includes a beacon transmission function module 39a, a probe response function module 39b, a security function module 39c and a register group 39d, each of which operates in accordance with values stored in a register. For example, in accordance with the values stored in the register, the beacon transmission function module 39a is turned ON/OFF, the operation mode of the probe response function module 39b is switched, and the operation of the security function module 39c is controlled. It should be noted that, in the register, by the operation of the CPU 33, the wireless operation parameter values contained in the factory-shipment setting information and/or the user setting information.

The beacon transmission function module 39a is configured to notify devices therearound of an SSID (Service Set Identifier) set to the wireless control unit 30 voluntarily and periodically. The beacon signal transmitted from the beacon transmission function module 39a and received by the wireless reception unit 41 is overlapped on the radio signal, and transmitted toward the wireless terminal 3 through the antenna 41a.

FIG. 4A shows an operation of the beacon transmission function module 39a of the MFP 10. The beacon transmission function module 39a periodically outputs a beacon signal carrying the SSID of the MFP 10 when turned ON, while does not output such a beacon signal when turned OFF.

The probe response function module 39b outputs a probe response signal containing the SSID of the MFP 10, as a response signal, when it receives the probe request signal transmitted by the wireless terminal 3. FIGS. 4B and 4C show the operation of the probe response function module 39b of the MFP 10.

The probe response function module 30b operates either in a first operation mode (hereinafter, referred to as mode 1) and in a second operation mode (mode 2). In mode 1, the probe response function module 39b outputs the probe response signal regardless whether the SSID same as that of the MFP 10 is included in the received probe request signal.

In mode 2, only when the SSID same as that of the MFP 10 is included in the received probe request signal (i.e., only when the received probe request signal is directed to the MFP 10, in which the probe response function module 39b is implemented, the probe response signal is output. In other words, in mode 2, only when the SSID information contained in the probe request signal is null (i.e., the received probe request signal is not directed to a specific device), the probe response function unit 39b does not respond to the probe request.

Figures 5, 6:
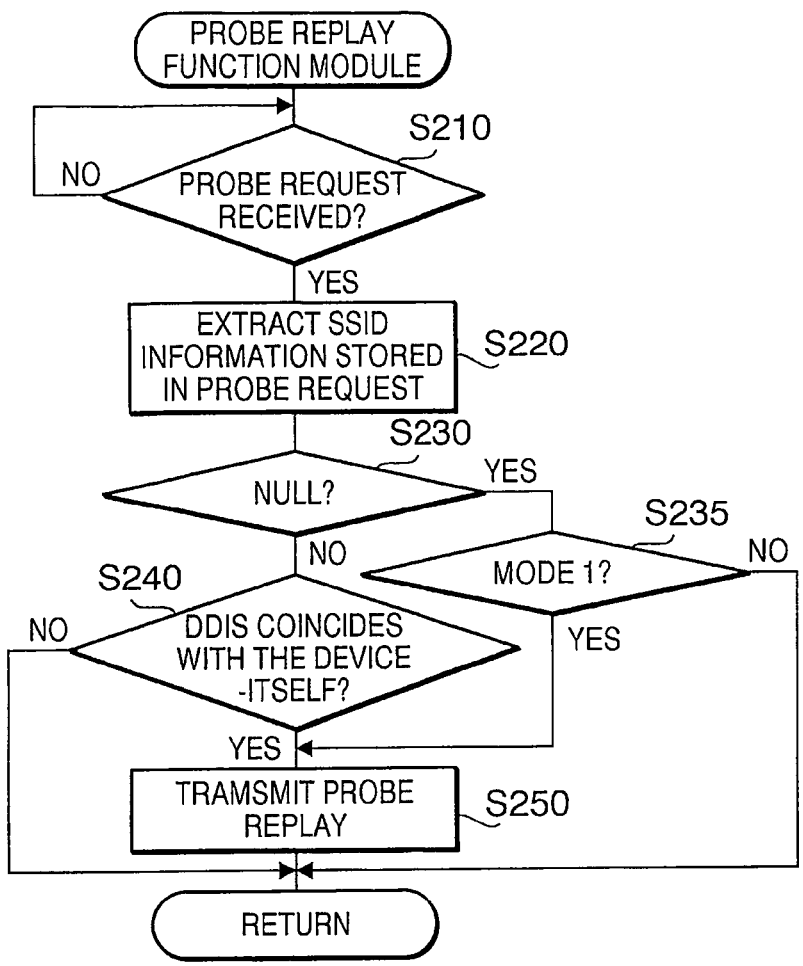
FIG. 5 shows a flowchart illustrating an operation of the probe responding function unit according to aspects of the invention.
FIG. 6 illustrates functions of the security function unit according to aspects of the FIG. 7 shows a flowchart illustrating a startup process executed by the CPU of the controlling unit of the MFP according to aspects of the invention.

FIG. 5 shows a flowchart illustrating an operation of the probe response function module 39b. When the probe response function module 39b receives the probe request signal (S210: YES) from the external wireless terminal 3 through the wireless reception unit 41, obtains the SSID information contained in the received probe request signal (S220), and then judges whether the thus obtained SSID information is null information (S230).

If the information is not null (S230: NO), the process judges whether the obtained SSID coincides with the SSID set to the MFP 10 in which the probe response function module 39b belongs (S240). It should be noted that the SSID of the MFP 10 (i.e., wireless LAN control unit 30) is stored in the ROM 34 or the NVRAM 37.

If the SSID contained in the probe request signal coincides with the SSID of the MFP 10 (S240: YES), the probe response function unit 39b generates the probe response signal containing its SSID, and transmits the probe response signal, through the wireless transmission unit 41, to the wireless terminal 3 from which the probe request signal was transmitted (S250). Then, the process returns to S210 and waits for reception of a subsequent probe request signal.

If the SSID contained in the probe request signal does not coincide with the SSID of the MFP 10 (S240: NO), the probe response function module 39b does not transmit the probe response signal, returns to S210, and waits for reception of a subsequent probe request signal.

If it is determined that SSID obtained from the received probe request signal is null information (S230: YES), the process judges whether the operation mode is "mode 1" (S235). If the operation mode is "mode 1" (S235: YES), the process proceeds to S250, where the probe response signal is transmitted to the external wireless terminal 3 from which the probe request was transmitted.

If it is determined that the operation mode is "mode 2" (S235: NO), the probe response function module 39b does not receive the probe response signal (i.e., S250 is skipped) and returns to S210. Then, the process waits for reception of a subsequent probe request signal.

With the above configuration, the probe response function module 39b does not respond to the probe request signal, which is not directed to the MFP 10 in which the probe response function module 39b is implemented (i.e., directed to any MFP 10).

Figure 9:
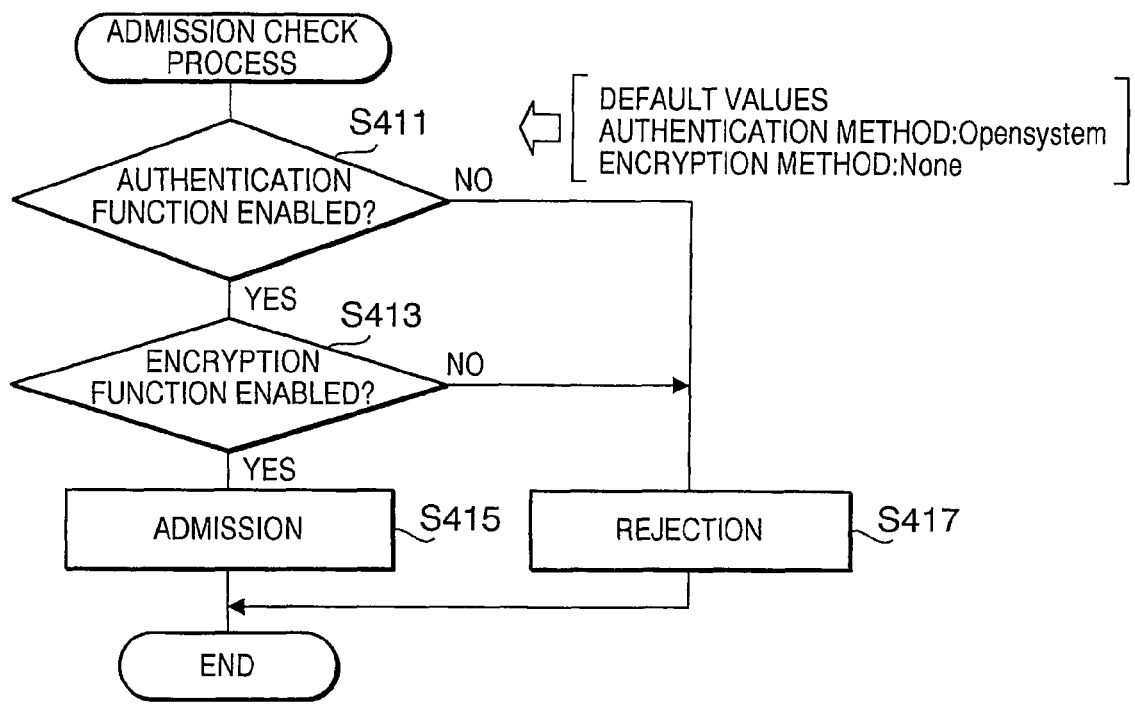
FIG. 9 shows a flowchart illustrating an admission judgment process executed by the CPU of the controlling unit of the MFP according to aspects of the invention.

Next, the security function module 39c will be described. FIG. 9 is a flowchart illustrating the admission judgment process realized by the security function module 39c.

The security function unit 39c includes, as security-related functions, an authentication function for executing an authentication procedure when a communication is performed with an external device (wireless terminal 3), and encryption function for encrypting transmission data (and decrypting the received data).

The authentication function includes, as operation mode, three modes: "OpenSystem" mode in which no authentication procedure is performed; "SharedKey authentication" mode in which authentication procedure is performed using a WEP (Wired Equivalent Privacy) key; and "IEEE802.1x authentication" mode in which the authentication procedure is performed in accordance with the IEEE802.1x authentication method.

It should be noted that the IEEE802.1x authentication mode can be categorized into multiple types. In the embodiment, it may be possible to configure the security function module 39c to use only a predetermined authentication type from among the plurality of types of modes. Alternatively, it may be possible to switch the plurality of types of authentication methods.

Further, the encryption function includes, as an operation mode, one of "none" mode which does not encrypt the information, "WEP" mode which utilizes the WEP key for encryption, "TKIP" mode in which TKIP (Temporal Key Integrity Protocol) is used, "AES" mode in accordance with the AES (Advanced Encryption Standard). Alternatives to WEP may also be used, including but not limited to, WPA.

The security function module 39c realizes the above-described authentication function and encryption function in a specified mode, in accordance with the parameter values set in the register (i.e., wireless operation parameter values), to executes the authentication procedure and encrypting of the transmission data.

Figure 7:
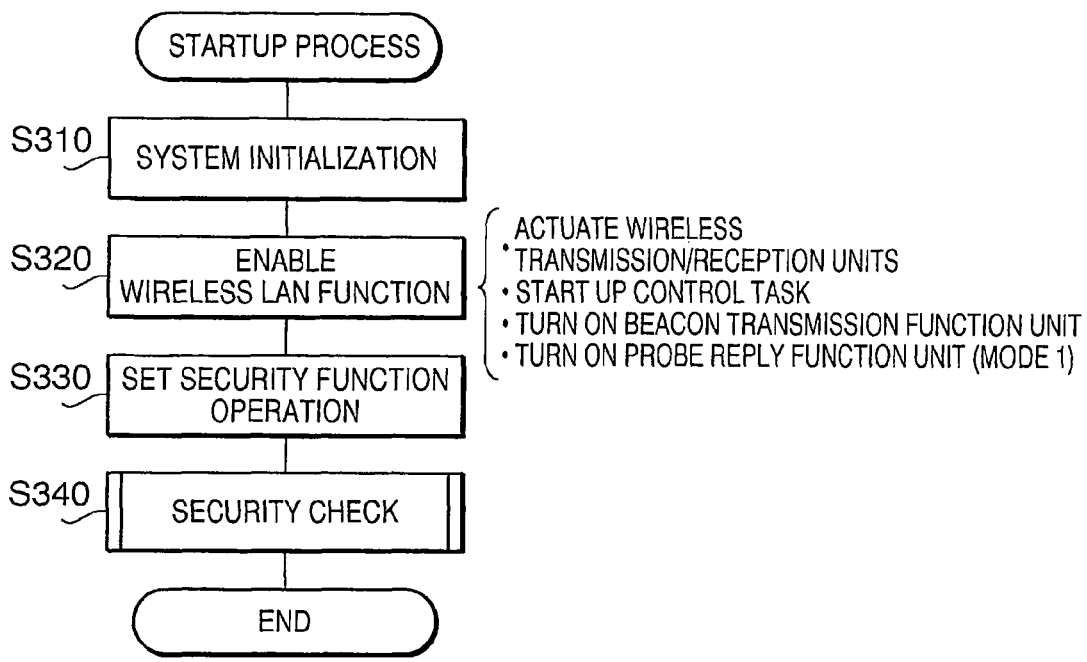

Next, a startup process, the security check process and the admission judgment process will be described. FIG. 7 shows a flowchart illustrating the startup procedure executed by the CPU 33 of the wireless LAN control unit 30. FIG. 8 shows a flowchart illustrating the security check process executed by the CPU 33 of the wireless LAN control unit 30. FIG. 9 shows a flowchart illustrating the admission judgment process executed by the CPU 33 of the wireless LAN control unit 30.

The wireless LAN control unit 30 is turned ON when the MFP 10 is powered ON, and the startup process is executed by the CPU 33. When the startup process starts, the CPU 33 initializes the entire system (i.e., each unit/module of the wireless LAN control unit 30) in S310. Then, in 320, the CPU 33 activates the wireless LAN function, so that the MFP 10 can communicate with the external device (e.g., the wireless terminal 3) in S320.

Specifically, in S320, the process supplies electric power to the wireless transmission/reception unit 41, through the power supply control unit 43, to activate the wireless transmission/reception unit 41 and the wireless communication control task which operates in the wireless lower protocol control unit 39. Further, the process turns ON the beacon transmission function module 39 and make the probe response function module 39b operate in "mode 1".

When the wireless LAN function is activated in S320, the CPU 33 proceeds to S330, and sets up the security function module 39c in accordance with security function-related wireless operation parameters (hereinafter, referred to as security operation parameters) so that the security function module 39c operates in accordance with the security operation parameters of the user setting information.

It should be noted that, if the user setting information has not been generated in the NVRAM 37, the setup of the security function module 39c is done based on the factory-shipment setting information stored in the ROM 34 instead of the user setting information so that the security function module 39c operates in accordance with the security operation parameters of the factory-shipment setting information.

As the security operation parameters, parameters representing the operation mode of the authentication or encryption function (i.e., parameters indicating the authentication or encryption method), parameters representing an authentication code to be used in the authentication function, parameters indicating an encryption key to be used in the encryption function may be used. According to this illustrative embodiment, the CPU 33 sets up the security function module 39c in accordance with the default values of the security operation parameters contained in the factory-shipment setting information, and the authentication function of the security function module 39c is set to the "OpenSystem" mode, and the encryption function is set to "None" mode.

After execution of S330, the CPU 33 proceeds to S340 and executes the security check process shown in FIG. 8.

When the security check process is started, the CPU 33 executes the admission judgment process (see FIG. 9) in S410.

As shown in FIG. 9, in S411, the CPU 33 judges whether the authentication function of the security function module 39c is made effective. In this embodiment, if the authentication function of the security function module 39c is set to the "OpenSystem" mode, it is determined that the authentication function is not available (i.e., the authentication function is OFF), while the authentication mode is set to another mode, it is determined that the authentication function is available (i.e., the authentication function is ON).

If it is determined that the authentication function of the security function module 39c is no available (S411: NO), the process proceeds to S417, where "Rejection" is issued, and the process returns to S420 of FIG. 8.

If it is determined that the authentication function is available (S41: YES), the CPU 33 proceeds to S413 and judges whether the encryption function of the security module 39c is available. If the encryption function is set to the "None" mode, it is determined that the encryption function is not available (i.e., the encryption function is OFF). If the encryption function is set to another mode, it is determined that the encryption mode is available (i.e., the encryption function is ON). If it is determined that the encryption function of the security function module 39c is not set to effective (S413: NO), the process proceeds to S417, where the rejection judgment is made, and the admission judgment process is finished.

If it is determined that the encryption function of the security function module 39c is enabled, the CPU 33 makes admission judgment in S415, and finishes the admission judgment process. Thereafter, the CPU 33 returns S420 of FIG. 2.

In S420, the CPU 33 judges whether the admission is determined in S410. If the admission is not determined (i.e., rejected), the CPU 33 proceeds to S430 and judges whether the timer provided to the wireless LAN control unit 30 operates. It should be noted that the timer referred to herein may be a hardware provided to the wireless LAN control unit 30, or a software time realized by the CPU 33. In the first embodiment, the timer operates as show in FIG. 10A, which will be described later.

If it is determined that the timer is operating (S430: YES), the CPU 33 finishes the security check process. If it is determined that the timer is not operating (S430: NO), the CPU 33 retrieves the renewal period stored in the NVRAM 37 (S440), sets the time to the timer (S450), and starts the timer (S460) to measure the set time. It should be noted that when the timer is started in S460, the CPU 33 finishes the security check process without waiting for measurement completion of the timer.

If the admission is determined in the admission judgment process (S420: YES), the CPU 33 proceeds to S470, where the CPU 33 stops the timer, and proceeds to S480. Specifically, the CPU 33 may stop the timer regardless whether the timer is operating or not. Alternatively, the CPU 33 may stop the timer when the timer is operating, and may proceeds to S480 without executing the terminating process of the timer when the timer is not operating.

In S480, the CPU 33 judges whether the wireless LAN function is disabled. Specifically, in this step, the CPU 33 judges whether the wireless LAN function is disabled by examining whether the wireless LAN function is enabled after a disabling process (see FIG. 10B) is executed.

If it is determined that the wireless LAN function is not disabled (S480: NO), the process finishes the security check process. If it is determined that the wireless LAN function is disabled (S480: YES), the process proceeds to S490 and enables the wireless LAN function. It should be noted that the step S490 is similar to the step S320 described above. After executing S490, the CPU 33 finishes the security check process.

Figure 10A:
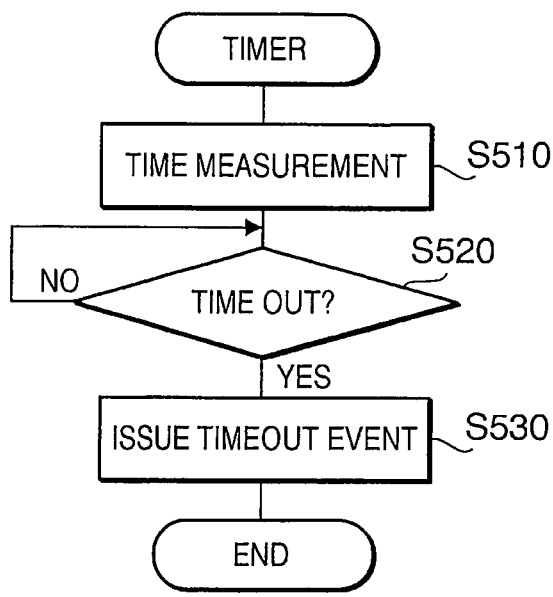
FIG. 10A shows a flowchart illustrating an operation of a timer according to aspects of the invention.

Next, a timer operation and the disabling process executed by the CPU 33 will be described, referring to FIGS. 10A and 10B. FIG. 10A shows a flowchart illustrating the operation of the timer, and FIG. 10B shows a flowchart illustrating the disabling process which is executed by the CPU 33 after a time period indicated by the renewal period information.

The timer starts measuring time, when it is activated, and keeps measuring time period until a predetermined time period (i.e., the time period represented by the renewal period information) has passed (S510). After elapse of the predetermined time period, the process determines the time is up (S520: YES), and makes a timeout event occur (S530). Then, the time measuring operation is automatically stopped.

Figure 10B:
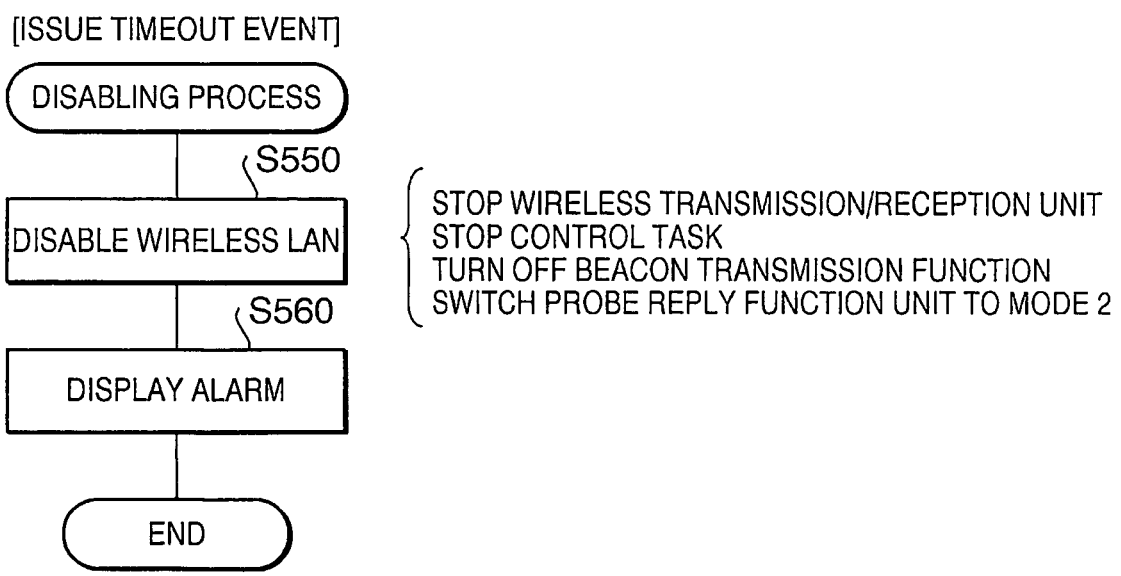
FIG. 10B shows a flowchart illustrating a disabling process executed by the CPU of the controlling unit of the MFP according to aspects of the invention.

If the timeout event occurs, the CPU 33 executes the disabling process shown in FIG. 10B. When the disabling process is started, the CPU 33 disables the wireless LAN function (S550). Specifically, according to the embodiment, one of items (1)-(3) indicated below is executed to disable the wireless LAN function.

(1) The CPU 33 controls the power supply control unit 43 to stop power supply to the wireless transmission/reception unit 41 to stop the operation of the same.

(2) The CPU 33 stops the wireless communication control task that operates in the wireless lower protocol control unit 39.

(3) The CPU 33 turns OFF the beacon transmission function module 39a and switches the operation mode of the probe response function module 39b to "mode 2".

When item (1) or (2) is executed, the wireless LAN function is completely disabled. On the other hand, when item (3) is executed, the wireless communication with the external wireless terminal 3, which does not know the SSID set to the wireless LAN control unit 30, is selectively disabled (i.e., restricted). In other words, the wireless communication between the wireless LAN control unit 30 and the external wireless terminal 3 which transmits a signal containing the SSID set to the wireless LAN control unit (i.e., the probe request signal) is not disabled.

If one of the procedures (1)-(3) is executed to disable the wireless LAN function, the CPU 33 proceeds to S560, and displays a warning message indicating that the wireless LAN function is disabled. Specifically, for example, the CPU 33 controls the display unit 23 provided to the MFP 10 via the CPU 11 to display a message saying that the wireless LAN function is disabled. Optionally, if the wireless LAN control unit 30 is provided with LED (Light Emitting Diode) for alarm display, the CPU 33 may notify of the disabled status through the LED. After execution of S560, the CPU 33 finishes the disabling process.

According to the above-described illustrative embodiment, after the wireless LAN control unit 30 built in the MFP 10 enables the wireless LAN function so as to be communicate with the external wireless terminal 3 (S310-S330), the security check process is executed (S340), and then it is judged whether the authentication and encryption functions serving as the security functions provided by the security function module 39b is operated (enabled) in S411 and S413.

If the operation mode of the authentication function is set to the "Opensystem" mode, which does not require the authentication procedure, or the operation mode of the encryption function is set to the "None" mode, which does not require encryption, the process determines that the authentication/encryption functions are disabled, and restricts the communication between the MFP 10 itself and the external terminal 3.

Specifically, according to item (1), the power supply control unit 43 stops power supply to the wireless transmission/reception unit 41 to disable the operation thereof without exception. Alternatively, according to item (2), the wireless communication control task that operates in the wireless lower protocol control unit 39 so that the procedure necessary for the communication between the MFP 10 and the wireless terminal 3 is inhibited. In this case, the communication between the MFP 10 and the wireless terminal 3 is disabled without exception.

On the other hand, according to item (3), output of the beacon, which serves as a notification signal for notifying of the existence of the MFP 10, is prohibited. Further, the MFP 10 is configured to respond to only a probe request signal directed to the MFP 10, and not to respond to a probe request directed to another MFP so that the probe response signal including the SSID of the MFP 10 will not be transmitted to an unidentified device, thereby the wireless LAN control unit 30 is shielded from unknown devices, which do not know the SSID of the MFP 10. With this configuration, the wireless communication with the wireless terminal 3, which does not know the SSID of the MFP 10, can be restricted.

According to the first embodiment, if a predetermined security function (e.g., the authentication function and the encryption function) implemented in the wireless LAN control unit 30 are not operating (are disabled), the wireless communication between the wireless LAN control unit 30 and the external device is restricted.

According to the above-described embodiment, the authentication and encryption functions are disabled in the factory-shipment state. In particular, if the WEP or WPA (Wi-Fi Protected Access) scheme is employed for authentication/encryption, since the authentication code and encryption code are required to be set, the authentication/encryption functions are disabled in the factory-shipment status.

Therefore, if the user does not make a setting to enable the authentication/encryption functions, the wireless LAN control unit 30 operates without performing the authentication/encryption. According to the above-described embodiment, in such a case (i.e., when the authentication/encryption functions are not enabled), the disabling process is executed. Therefore, even when the user fails to configure the security function of the wireless LAN control unit 30, the security of the network 1 is maintained.

Further, according to the embodiment described above, after the disabling process is executed, if the setting of the security function unit 39 of the wireless LAN control unit 30 is changed (S120) and the authentication/encryption functions are activated, the wireless LAN function is enabled (S490) and the restriction of the communication is released. Therefore, the user does not need to reboot the MFP 10 or wireless or the wireless LAN control unit 30. Thus, convenient devices can be provided to the user.

Further, according to the above-described embodiment, the wireless LAN control unit 30 is configured such that, when the inquiry signal transmitted from the external device (e.g., the probe request including the SSID of the MFP 10) is received, the response thereto is allowed. Further, when an inquiry signal directed to non-specified device (e.g., the probe request that does not include the SSID of the MFP 10) is received, the response thereto is inhibited. With the above configuration, the legitimate access from the external device to the wireless LAN control unit 30 is allowed, while the illegitimate access from the external device to the wireless LAN control unit 30 is inhibited. Accordingly, deterioration of the security of the network 1 can be prevented without causing inconvenience to the legitimate users.

According to the above-described embodiment, the disabling process that restricts the wireless communication between the wireless LAN control unit 30 and the external device is differed by the renewal period stored in the NVRAM 37 after decision at S420 has been determined to be NO. During the differed period, a setting regarding the security function may be executed by the external device, through the network.

In the above embodiment, the wireless LAN control unit 30 is implemented in the MFP 10. Therefore, if the user uses the operation unit 25 of the MFP 10 to enter settings regarding the security function, operability is relatively bad. However, if the user uses the wireless terminal device 3, which may include a personal computer, connected to the network 1 to perform the setting through the network, the user can use an interface having an excellent operability (e.g., a keyboard) to make the setting, which is convenient to the user.

Further, according to the embodiment, in the disabling process, after the wireless LAN function is disabled, a warning message is displayed on the display 23 to inform the user of the restriction in wireless communication. Therefore, it is possible to ask the user to change the setting, if necessary, and the problem of forgetting to set the security function can be resolved at an early stage.

In the above-described illustrative embodiment, when both the authentication function and encryption function are inoperable, the disabling process is executed. However, aspects of the invention should not be limited to such a configuration. That is, the disabling process may be executed when the user forgot to make necessary changes to the default (e.g., factory-shipment) security settings and the communication between the wireless LAN control unit 30 and the external device can be performed with the insufficient security function. That is, the admission judgment may be made depending on whether the setting values regarding the security setting have not been changed in comparison with the default values (e.g., factory-shipment values). Hereinafter, such a modification (first modification) will be described.

The first modification has substantially the same hardware configuration, and most of the operation thereof is similar to that of the above-described embodiment, except the admission judgment A is employed instead of the above-described admission judgment. Therefore, in the following description, only the admission judgment A will be described.

Figure 11:
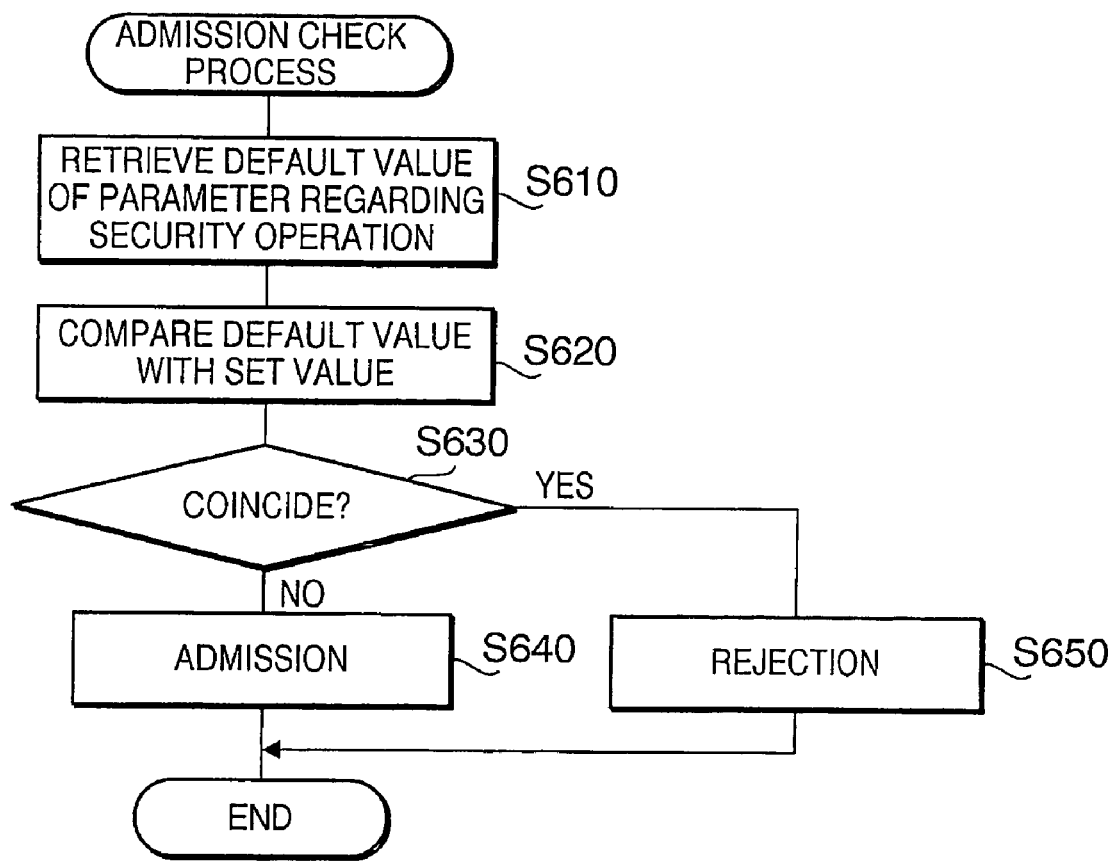
FIG. 11 shows a flowchart illustrating the admission judgment according to a modification of the flowchart shown in FIG. 9.

FIG. 11 shows a flowchart of the admission judgment A process according to the first modification, which is executed in S410 of the security check process shown in FIG. 8.

When the admission judgment process starts, the CPU 33 retrieves default values (factory-shipment values) of predetermined one or multiple security operation parameters from the ROM 34 (S610). Then, the CPU 33 compares the retrieved security operation parameters (default values) with the currently set parameter values set to the security function module 39c (S620). If all the setting values set to the security function module 39c coincide with the default values stored in the ROM 34 (S630). Specifically, the security operation parameters to be compared may be one representing operation mode of the authentication function and encryption function.

If it is determined that the security operation parameters do not coincide (S630: NO), admission judgment is made (S640). If they coincide with each other (S630: YES), the rejection judgment is made (S650). Thereafter, the admission judgment process is finished, and the steps S240 onwards are executed.

According to the first modification, the wireless land control unit 30 built in the MFP 10 activate the wireless LAN function and makes the wireless LAN control unit 30 connectable with the external wireless terminal 3 (S310-S330). The, the security check process is executed (S340). In S410, the admission judgment shown in FIG. 11 is executed to judge whether the value of the security operation parameter that characterizes the operation of the security function module 39c is the same as the default value thereof stored in the ROM 34 (S610-S630). If the setting values of the security operation parameter is equal to the default value stored in the ROM 34 (S630: YES), the wireless communication between the MFP 10 and the wireless terminal 3 is restricted (or disabled) in accordance with one of the items (1)-(3) above.

Thus, according to the first modification, it is possible to prevent the security function unit 39c from operating based on the default values (i.e., the factory-shipment values) and communicating with the external device 3 for a relatively long period in such a state. Thus, even if the user fails to set the security function, the network security is prevented from being lowered.

In the first modification, if the operation mode of the authentication function in the factory-shipment state is "Opensystem" mode, and the operation mode of the encryption function is "None" mode, then if the CPU 33 compares the security operation parameters representing the authentication function and the encryption function with the default values, and judges whether the parameter values are the same as the default values, the admission judgment is made if the encryption function is in the "None" mode, even if the operation mode of the authentication function is "Opensystem" mode.

That is, according to the first embodiment, even if the authentication function is OFF, if the encryption function is ON, the disabling process will not be executed. Even in this state, the deterioration of the security can be prevented.

Further, according to the first modification, not only when the operation mode of the authentication function is set to the "Opensystem" mode, and the operation mode of the encryption function is set to the "None" in the factory-shipment state, but the authentication function and encryption function are activated. It should be noted that, even if the authentication code used for the authentication process and the encryption code used for the encryption key are default values, deterioration of the security due to user's forgetting to set the security functions can be prevented.

For example, in the factory-shipment state, when the operation mode of the authentication function is in "Sharedkey authentication" mode, and the operation mode of the encryption function is in the WEP mode, if the security operation parameter representing the WEP key is regarded as the security operation parameter used for comparison, and if the WEP key set to the security function module 39c has the default value, the judgment at S630 is "YES" and the rejection judgment is made. Therefore, unless the user changes the setting of the WEP key, the wireless LAN function is disabled, and the deterioration of the network security by using the default WEP key can be prevented.

Furthermore, according to the first modification, for one or multiple security operation parameters (used for comparison), it is judged whether the values of the security operation parameters set to the security function module 39c coincide with the default values stored in the ROM 34 (S630). Only when all the values of the security operation parameters coincide with the default values, the rejection judgment is made. However, this may be modified such that even if one of the operational parameters coincides with the default value, the rejection judgment is made.

Figure 12:
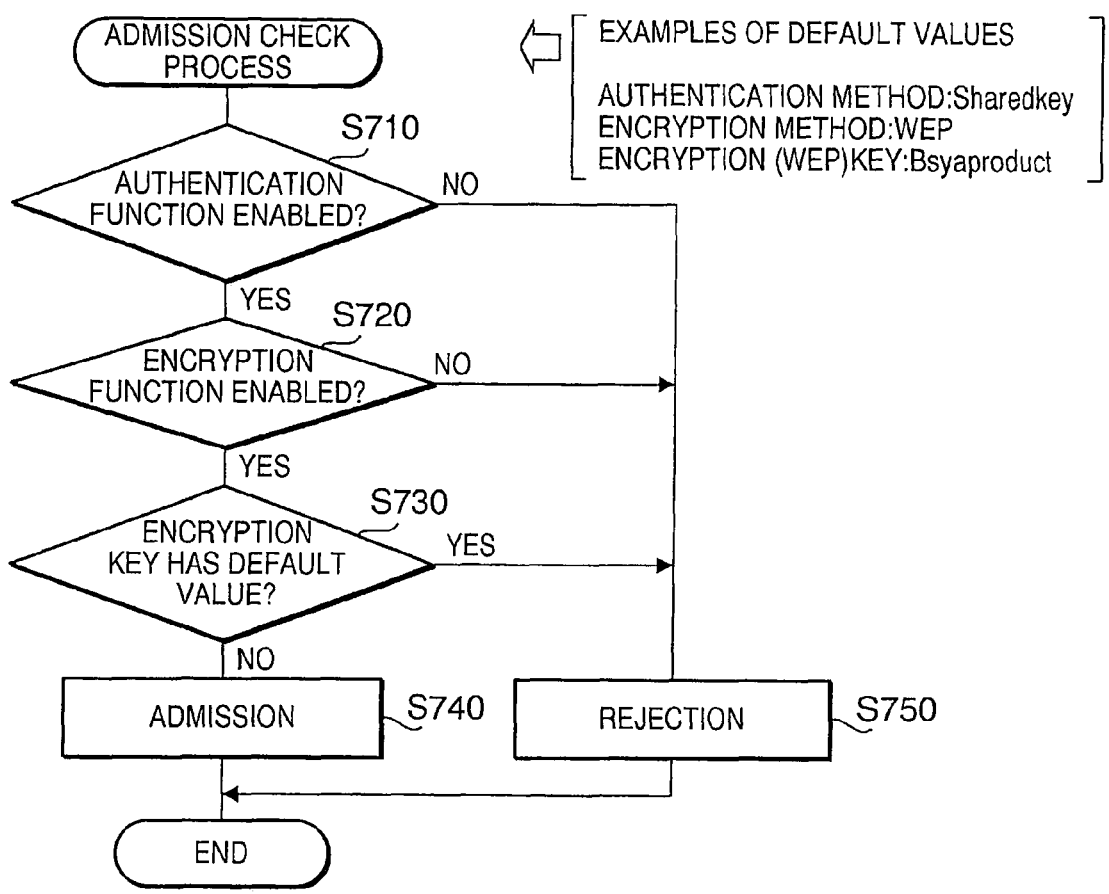
FIG. 12 shows a flowchart illustrating the admission judgment according to a second modification of the flowchart shown in FIG. 9.

If the operation mode of the authentication function is "Sharedkey authentication" mode and the operation mode of the encryption function is "WEP" mode in the factory-shipment state, the admission judgment process as shown in FIG. 12 may be employed, which will now be described as a second modification.

That is, FIG. 12 shows a flowchart of the admission judgment process according to the second modification.

In FIG. 12, firstly, it is judged whether the authentication function of the security function of the security function module 39c is enabled (S710). Specifically, if the authentication function is set to the "OpenSystem" mode, it is determined that the authentication function is disabled (i.e., the authentication function is OFF), while if the authentication function is set to another mode, it is determined that the authentication function is enabled. If it is determined that the authentication function is disabled (S710: NO), the process proceeds to S750, and rejection judgment is made. Then, the process finishes the admission judgment process, and proceeds to S420.

If it is determined that the authentication function is enabled (S710: YES), the CPU 33 proceeds to S720, and judges whether the encryption function is enabled. Specifically, if the encryption function is set to the "None" mode, it is determined that the encryption mode is disabled (i.e., the encryption function is OFF), while if the encryption function is set to another mode, it is determined that the encryption mode is enabled. If it is determined that the encryption mode is disabled (S720: NO), the process proceeds to S750, rejection judgment is made and the admission judgment process is finished.

If the encryption function is enabled (S720: YES), the process proceeds to S730 and judges whether the encryption key used for encrypting is the default value. If the encryption key is the default value (S730: YES), the rejection judgment is made (S750), and the admission judgment process is finished.

If the encryption key is not the default value (S730: NO), the CPU 33 proceeds to S740, where the admission judgment is made, and the admission judgment process is finished.

According to the above configuration, even if the encryption function is enabled, if the encryption key is the default value, the rejection judgment is made and the disabling process is executed. Therefore, in comparison with a case in which whether the authentication function and encryption function are enabled or not are checked, security of the network can be held.

It should be noted that the management systems are described as an illustrative embodiment and its modifications, and they can be modified in various ways without departing from the scope of the invention.

Figure 13A:
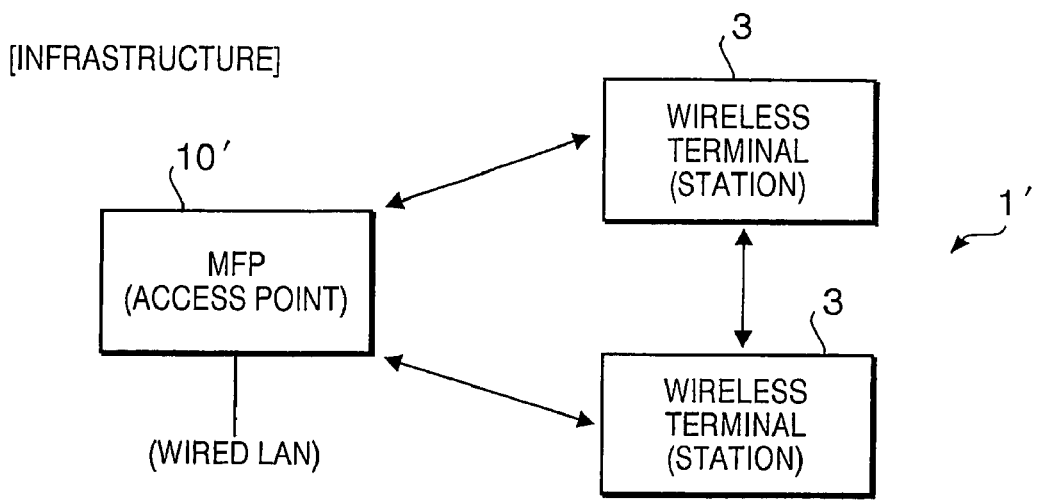
FIG. 13A is a block diagram showing a configuration of an infrastructure type network according to aspects of the invention.
Figure 13B:
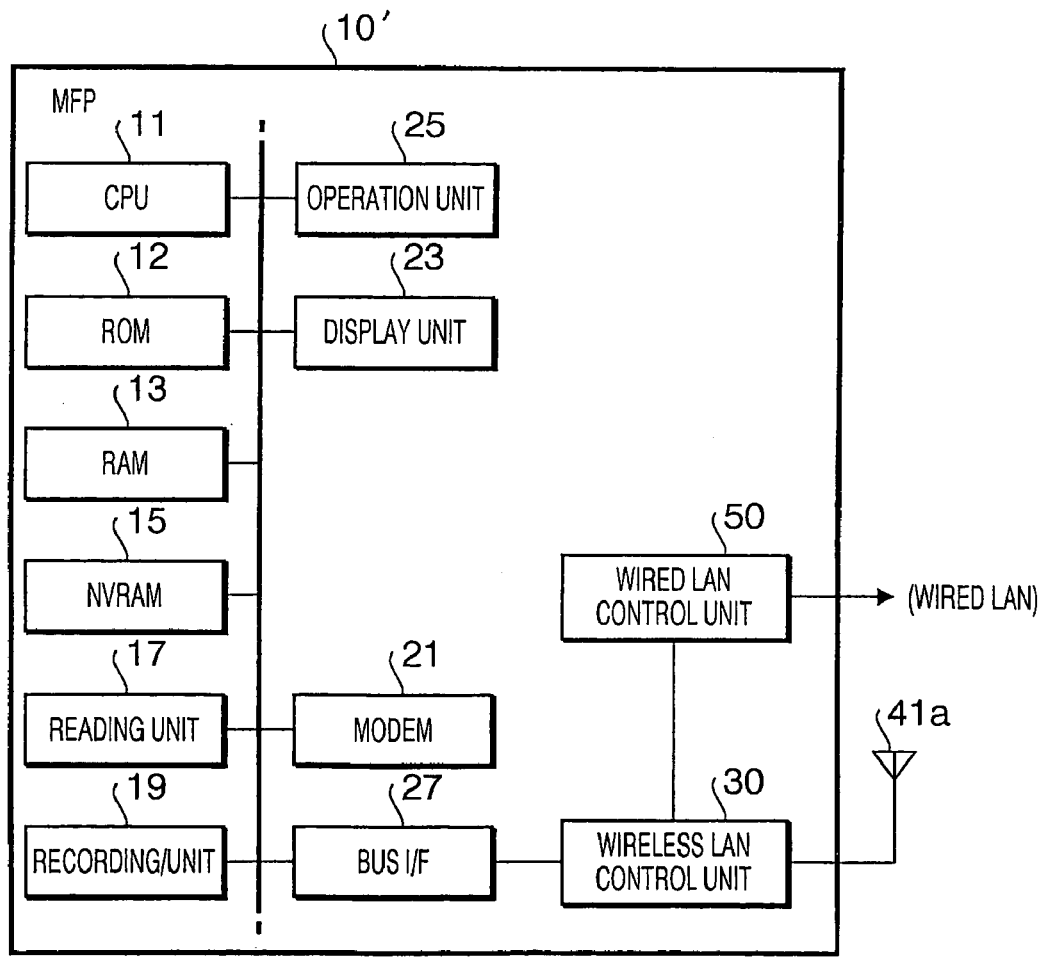
FIGS. 13B is a block diagrams showing configuration of the MFP of the infrastructure type network shown in FIG. 13A.

For example, in the above-described embodiment and modifications, the MFP 10 functions as a station of the ad-hoc network 1. This configuration is only an example, and as shown in FIG. 13A, aspects of the present invention are applicable to an MFP 10' which functions as an access point of the infrastructure type network 1'. FIG. 13A shows the configuration of the infrastructure type network 1', and FIG. 13B shows a configuration of the MFP 10' which functions as the access point of the infrastructure type network 1' shown in FIG. 13A.

The MFP 10' functions as the access point and includes a wired LAN control unit 50 to be connected to a wired LAN. The other configuration is substantially similar to that of the MFP 10 described above. The security check process and disabling process are executed in the MFP 10', the unauthorized access to the wireless terminal on the network 1' through the MFP 10' and leakage of confidential information by monitoring of the wireless signal can be prevented.

Further, in the embodiment above, the digital MFP is described. Aspects of the invention need not be limited to the described configuration, and for example, applicable to the wireless station or other wireless communication device having a function of an access point. For example, aspects of the present invention are applicable to a scanner having a wireless communication function, a facsimile device, an imaging device including a digital camera and a digital still camera, a printer having the wireless communication function, an image outputting device including a projector and a display, and information server having a storage device implemented with the wireless communication function.

What is claimed is:

1. A wireless communication management system for managing a wireless communication device having a security function, said wireless communication management system comprising:
   said wireless communication device including:
      a wireless communication function unit enabling wireless communication of said wireless communication device;
      a security function unit configured to effect a security function to the wireless communication device by setting an operational setting of the security function unit in accordance with a user-input parameter representing one of operation of the security function and non-operation of the security function;
      a security unit configured to set an operational setting of said security function unit in accordance with the user input;
      a security judging unit configured to judge in the wireless communication device whether the operational setting of said security function unit is set: and
      a communication restriction unit configured to restrict the wireless communication of said wireless communication device from communicating with an external device if the security judging unit judges that the operational setting of said security function unit is set for non-operation of the security function that was set based on the user-input parameter,
   wherein the security function includes at least a function to execute secure wireless communication, and
   wherein the security judging unit judges in the wireless communication device whether the operational setting of the function to execute the secure wireless communication is in effect.

2. The wireless communication management system according to claim 1,
   wherein the security judging unit is configured to judge whether the security function of the communication device is operating when the wireless communication device is capable of performing a wireless communication with an external device, and
   wherein the communication restriction unit restricts the wireless communication with the external device if the security judging unit judges that the security function of the communication device is not operating.

3. The wireless communication management system according to claim 2, further comprising:
   a restriction releasing unit that releases the restriction effected by the communication restriction unit if the security function of the wireless communication function starts to operate after the wireless communication between the wireless communication device and the external device was restricted.

4. The wireless communication management system according to claim 2,
   wherein the communication restriction unit restricts the wireless communication with the external device for a predetermined period after the security judging unit has judged that the security function of the communication device is not operating.

5. The wireless communication management system according to claim 4,
   wherein the communication restriction unit includes a data storage storing the length of the predetermined period.

6. The wireless communication management system according to claim 5,
   wherein the data storage is a non-volatile re-writable data storage.

7. The wireless communication management system according to claim 4,
   wherein the security judging unit judges whether the security function of the communication device is operating during the predetermined period, and
   wherein the communication restriction unit does not restrict the communication between the wireless communication device and the external device if the security judging unit judges that the security function of the communication device is started to operate during the predetermined period.

8. The wireless communication management system according to claim 2, further comprising:
   a restriction notification unit that notifies of the restriction of the wireless communication between the wireless communication device and the external device when the communication restriction unit restricts the wireless communication between the wireless communication device and the external device.

9. The wireless communication management system according to claim 2,
   wherein the security function includes at least one of a function to execute an authentication procedure when the wireless communication device starts the wireless communication with the external device and a function of encrypting signal to be transmitted from the wireless communication device to the external device.

10. The wireless communication management system according to claim 1, further comprising:
    a restriction releasing unit that releases the restriction effected by the communication restriction unit if the value of the parameter is changed to a value different from the default value after the wireless communication between the wireless communication device and the external device was restricted.

11. The wireless communication management system according to claim 1,
    wherein the communication restriction unit restricts the wireless communication with the external device for a predetermined period after the security judging unit has judged that the security function of the communication device is not operating.

12. The wireless communication management system according to claim 11,
wherein the communication restriction unit includes a data storage storing the length of the predetermined period.

13. The wireless communication management system according to claim 12,
wherein the data storage is a non-volatile re-writable data storage.

14. The wireless communication management system according to claim 11,
wherein the security judging unit judges whether the security function of the communication device is operating during the predetermined period, and
wherein the communication restriction unit does not restrict the communication between the wireless communication device and the external device if the security judging unit judges that the security function of the communication device is started to operate during the predetermined period.

15. The wireless communication management system according to claim 1, further comprising:
a restriction notification unit that notifies of the restriction of the wireless communication between the wireless communication device and the external device when the communication restriction unit restricts the wireless communication between the wireless communication device and the external device.

16. The wireless communication management system according to claim 1,
wherein the security function includes at least one of a function to execute an authentication procedure when the wireless communication device starts the wireless communication with the external device and a function of encrypting signal to be transmitted from the wireless communication device to the external device.

17. A wireless communication management system for managing a wireless communication device having a security function, said wireless communication management system comprising:
said wireless communication device including:
a wireless communication function unit enabling wireless communication of said wireless communication device:
a security function unit configured to effect a security function to the wireless communication device by setting an operational setting of the security function unit in accordance with a user-input parameter representing one of operation of the security function and non-operation of the security function;
a security unit configured to set an operational setting of said security function unit in accordance with the user input;
a security judging unit configured to judge in the wireless communication device whether the operational setting of said security function unit is set such that the predetermined security is in effect; and
a communication restriction unit configured to restrict the wireless communication of said wireless communication device from communicating with an external device if the security judging unit judges that the operational setting of said security function unit is set for non-operation of the security function that was set based on the user-input parameter,
wherein the security judging unit is configured to judge whether the security function of the communication device is operating when the wireless communication device is capable of performing a wireless communication with an external device,
wherein the communication restriction unit restricts the wireless communication with the external device if the security judging unit judges that the security function of the communication device is not operating,
wherein the wireless communication device includes a notification output unit that outputs a notification signal indicating that the wireless communication device exists to the external device, and
wherein the communication restriction unit disables the notification output unit from outputting the notification signal so that the wireless communication device is hidden from the external device, thereby restricting the wireless communication between the wireless communication device and the external device.

18. The wireless communication management system according to claim 17,
wherein the notification output unit voluntarily outputs the notification signal to the external device if a predetermined condition is satisfied.

19. The wireless communication management system according to claim 17,
wherein if the wireless communication device receives at least one of an inquiry signal directed to the wireless communication device and an inquiry signal directed to unidentified devices, the notification output unit outputs the notification signal to the external device from which the wireless communication device has received the inquiry signal, and
wherein the communication restriction unit disables the notification output unit from outputting the notification signal to the external device only when the wireless communication device has received the inquiry signal directed to unidentified devices.

20. A wireless communication management system for managing a wireless communication device having a security function, said wireless communication management system comprising:
said wireless communication device including:
a wireless communication function unit enabling wireless communication of said wireless communication device;
a security function unit configured to effect a security function to the wireless communication device by setting an operational setting of the security function unit in accordance with a user-input parameter representing one of operation of the security function and non-operation of the security function;
a security unit configured to set an operational setting of said security function unit in accordance with the user input;
a security judging unit configured to judge in the wireless communication device whether the operational setting of said security function unit is set such that the predetermined security is in effect; and
a communication restriction unit configured to restrict the wireless communication of said wireless communication device from communicating with an external device if the security judging unit judges that the operational setting of said security function unit is set for non-operation of the security function that was set based on the user-input parameter,
wherein the wireless communication device includes a notification output unit that outputs a notification signal indicating that the wireless communication device exists to the external device, and wherein the communication restriction unit disables the notification output unit from outputting the notification signal so that the wireless communication device is hidden from the external device, thereby restricting the wireless communication between the wireless communication device and the external device.

21. The wireless communication management system according to claim 20,
wherein the notification output unit voluntarily outputs the notification signal to the external device if a predetermined condition is satisfied.

22. The wireless communication management system according to claim 20,
wherein, if the wireless communication device receives at least one of an inquiry signal directed to the wireless communication device and an inquiry signal directed to unidentified devices, the notification output unit outputs the notification signal to the external device from which the wireless communication device has received the inquiry signal, and
wherein the communication restriction unit disables the notification output unit from outputting the notification signal to the external device only when the wireless communication device has received the inquiry signal directed to unidentified devices.

23. A non-transitory computer-readable medium having a program stored thereon, said program including instructions to be executed by a computer, the computer operating to manage a wireless communication device implemented with a user-modifiable security function for securing a security of a communication, the instructions causing the computer to perform the steps of:
enabling wireless communication of said wireless communication device via a wireless communication function unit;
effecting a security function to the wireless communication device parameter representing one of operation of the security function and non-operation of the security function via a security function unit;
setting an operational setting of said security function unit in accordance with a user input via a security unit;
judging in the wireless communication device whether the operational setting of said security function unit is set such that the predetermined security is in effect; and
restricting the wireless communication by the wireless communication device from communicating with an external device if the security judging unit judges that the predetermined the operational setting of said security function unit is set for non-operation of the security function that was set based on the user-input parameter,
wherein the security function includes at least a function to execute secure wireless communication, and
wherein judging in the wireless communication device judges whether the operational setting of the function to execute the secure wireless communication is in effect.

24. A method of managing a wireless communication device implemented with a user-modifiable security function for securing a security of a communication, the instructions causing the computer to perform the steps of:
enabling wireless communication of said wireless communication device via a wireless communication function unit;
effecting a security function to the wireless communication device via a security function unit;
setting an operational setting of said security function unit in accordance with a user input parameter representing one of operation of the security function and non-operation of the security function via a security unit;
judging in the wireless communication device whether the operational setting of said security function unit is set such that the predetermined security is in effect; and
restricting the wireless communication by the wireless communication device from communicating with an external device if it is judged that the predetermined the operational setting of said security function unit is set for non-operation of the security function that was set based on the user-input parameter,
wherein the security function includes at least a function to execute secure wireless Communication, and
wherein judging in the wireless communication device judges whether the operational setting of the function to execute the secure wireless communication is in effect.

* * * * *